April 16, 1968    C. E. BLANCHARD, JR    3,378,284
UNIVERSAL COUPLING
Filed Dec. 6, 1965
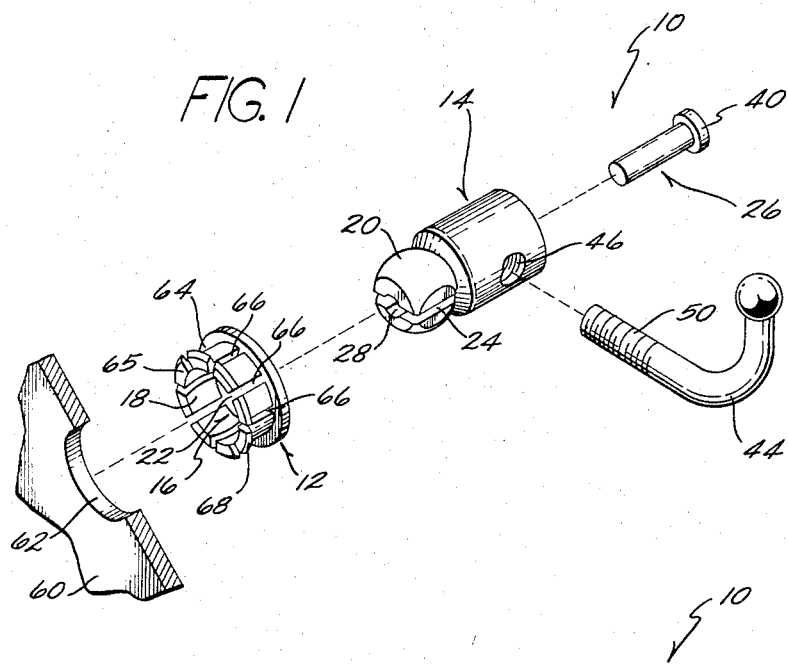
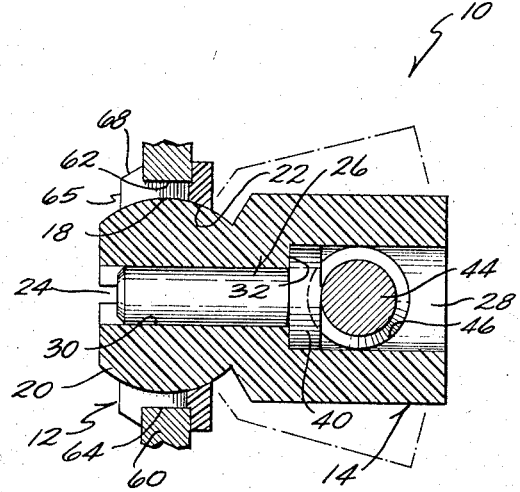
INVENTOR
CLARENCE E. BLANCHARD JR.
BY
Wheeler, Wheeler & Wheeler
ATTORNEYS

3,378,284
UNIVERSAL COUPLING

Clarence E. Blanchard, Jr., Kenosha, Wis., assignor to Outboard Marine Corporation, Waukegan, Ill., a corporation of Delaware
Filed Dec. 6, 1965, Ser. No. 511,726
6 Claims. (Cl. 287—21)

ABSTRACT OF THE DISCLOSURE

Disclosed herein is a connecting device comprising a first member having therein a bore defining a partially spherical socket, a second member having thereon a partially spherical ball portion receivable in said socket to afford universal movement therebetween, and means on the ball portion for affording resilient collapse thereof to afford insertion into the socket, together with means for preventing collapse of the ball portion comprising a locking member receivable in said second member and including means for preventing removal of said locking member.

---

This invention relates to a connecting device and more particularly to a connecting device affording universal movement.

An object of this invention is to provide a connecting device which affords easy and quick universal mounting of two or more cooperating parts to each other and which can be cheaply and easily manufactured.

Another object of the invention is to provide a universal connecting device which can be easily mounted to the parts to be connected and which can be easily and efficiently assembled.

Another object of the invention is to provide a universal connecting device which is made of plastic and which, therefore, requires no lubrication.

In accordance with the invention, the connecting device generally comprises first and second members which can be easily mounted on the parts to be universally connected. The first member is provided with a spherical socket which receives a partially spherical ball portion on the second member. The first member can also include means for easy, quick connection thereof to one of the parts to be universally connected. The ball portion of the second member includes means for affording resilient flexing thereof to afford partial collapse so as to enable insertion of the ball portion into the socket after which the ball portion assumes its original shape, thereby preventing withdrawal from the socket. Means are also provided to prevent flexure of the ball portion when received in the socket to thereby prevent removal of the ball portion from the socket. Other means are provided for retaining the means for preventing ball portion flexure.

Other objects, advantages and features will become apparent from the following description and accompanying drawings, in which:

FIGURE 1 is an exploded view of an universal connecting device embodying various of the features of the invention; and FIGURE 2 is a cross-sectional view of the assembled universal connecting device shown in FIGURE 1.

Referring to the drawings, the universal connecting device or coupling of the invention is broadly identified by the numeral 10 and generally comprises a first or female member 12 and a second or male member 14. The female member includes a bore 16 defining a partially spherical socket 18 and an entrance opening 22.

The male member 14 includes a partially spherical ball portion 20 which is received in the socket 18 to afford universal movement between the female and male members 12 and 14 and which has a larger diameter than the diameter of the entrance opening 22. Means are provided for affording resilient collapse or flexure of the ball portion 20 for insertion of the ball portion 20 into the socket 18. When the ball portion 20 is thus inserted into the socket 18, the resiliency of the ball portion 20 causes it to return to its original shape to thereby prevent unwanted withdrawal of the male member 14 from the female member 12.

The aforementioned means comprises fabrication of the male member from a resiliently flexible material and one or more slots 24 extending axially of, and co-extensively with, the ball portion 20. The slot 24 defines opposite ball portion halves which can be moved toward each other a sufficient distance to allow insertion of the ball portion 20 through the entrance opening 22 and into the socket 18. The female and male members 12 and 14 are preferably made of plastic material to afford the desired resiliency and also to eliminate the need of lubrication between the working surfaces of the socket 18 and the ball portion 20.

To prevent withdrawal of the ball portion 20 of the male member 14 from the socket 18 of the female member 12, means are provided for preventing collapse or flexure of the ball portion 20. Such means generally comprises a locking member in the form of a pin 26 insertable into a bore or opening 28 in the female member. The bore 28 passes through the slot 24 and includes a first portion 30 which is of reduced diameter, which receives the main body of the locking pin 26, and which defines a land or shoulder 32 in the bore 28. The locking pin 26 includes a head 40 which engages the land or shoulder 32 when the locking pin 26 is fully inserted into the bore 28. In the illustrated embodiment, the first portion of the bore 28 is of a diameter which is slightly larger than the width of the slot 24. Insertion of the locking pin 26 into the bore 28 prevents collapse of the ball portion 20, thereby preventing withdrawal of the male member 14 from the female member 12. The locking pin 26 is also preferably made of plastic material.

Means are employed for preventing withdrawal of the locking pin 26 from the bore 28. Said means generally comprises a blocking member 44 received in transverse bore 46 in the male member 14. The blocking member 44 prevents removal of the locking pin to retain the locking pin 26 in place and can include a threaded end 50 which is self-threading in the bore 46 of the male member 14. In the preferred construction, the bore 46 is disposed in the male member 14 so that when the locking pin 26 is inserted in the bore 28, the head 40 of the locking pin partially overlaps the transverse bore 46, as shown in FIGURE 2. More specifically, the locking pin head 40 overlaps the transverse bore 46 at a distance less than the depth of the threads of blocking member 44, so that the threads of the blocking member 44 cut through a portion of head 40 without being jammed in the bore 46.

Means are provided for affording connection of the female member 12 to a part 60 having a bore 62. Such means comprises fabrication of the female member from a resiliently flexible material and includes a groove 64 on the wall 65 of the female member 12 together with a series of slots 66 in the wall 65, thereby affording partial collapse of the wall 65 in a manner similar to collapse of the ball portion. The groove 64 has a diameter which is slightly less than the diameter of the bore 62 of the part 60 and has a width which is slightly greater than the thickness of part 60. To facilitate entry of the female member 12 into bore 62, the female member 12 has a leading edge 68 defining a camming surface. The slots 66 afford sufficient resilient flexing of the female member 12 so that the female member 12 can be easily pressed into the bore 62 of the part 60 until the female member 12 snaps into place, as shown in FIGURE 2, with the groove 64 receiving the part 60. Insertion of the male member 14 into the female member 12 locks the female member 12 in the bore 62.

Another part (not shown) can be connected to the male member 14 in any suitable manner, or the male member can be a portion of said other part, or said part can be connected to the blocking member 44 in any suitable manner or the blocking member can be a portion of said other part, thereby providing two parts which are universally connected to each other. Also, the universal connecting device 10 affords universal movement between the male and female members 14 and 12 and/or, if desired, can afford rotary movement between the female member 12 and the part which carries the female member 12.

Various of the features of the invention are set forth in the following claims.

What is claimed is:

1. A connecting device comprising a first member having therein a bore defining a partially spherical socket, a second member having thereon a partially spherical ball portion receivable in said socket to afford universal movement between said first and second members, means on said ball portion including a slot therethrough for affording resilient collapse of said ball portion to afford insertion thereof into said socket whereupon said ball portion assumes its original shape to afford holding of said second member in said first member, said second member having an opening communicating with said slot, means for preventing collapse of said ball portion comprising a locking member receivable in said opening and extending into said slot, and means for preventing removal of said locking member.

2. A device in accordance with claim 1 wherein said second member has a bore disposed transversely of and in communication with said opening and said means for preventing removal of said locking member comprises a blocking member disposed in said transverse bore.

3. A connecting device for transmitting universal movement between parts, said device comprising a first member having means for selectively detachably mounting said first member on one of said parts, said first member having a partially spherical socket including an entrance opening, a second member adapted for connection to the other of said parts, said second member having therein a partially spherical ball portion having a maximum diameter larger than said entrance opening and means on said ball portion for affording resilient flexing of said ball portion for insertion thereof into said socket, and means for preventing resilient flexing of said ball portion including a bore in said second member passing through said slot and a locking pin disposed in said bore to thereby prevent flexing of said ball portion, and means for preventing removal of said locking pin.

4. A device in accordance with claim 3 wherein said means preventing removal of said locking pin includes a transverse bore passing through said first bore and a blocking member received in said transverse bore to prevent removal of said locking pin.

5. A device in accordance with claim 4 wherein said second member is made of plastic material and said locking pin is made of plastic material and includes a head portion which partially overlaps said transverse bore and said blocking member includes a threaded end which is threaded into said transverse bore and at least partially threaded into said head of said locking pin.

6. A device in accordance with claim 3 wherein said first member has an outer generally cylindrical wall and wherein said means for mounting said first member on one of said parts includes an annular groove on said wall, and a series of angularly spaced axial slots in said wall to afford flexing of said first member upon insertion thereof into an opening in said one of said parts.

References Cited

UNITED STATES PATENTS

| 2,381,391 | 8/1945 | Brown | 308—72 |
| 2,717,792 | 9/1955 | Pelley | 287—88 XR |
| 2,937,834 | 5/1960 | Orenick et al. | 85—81 XR |

FOREIGN PATENTS

| 1,111,742 | 11/1955 | France. |
| 885,198 | 12/1961 | Great Britain. |
| 1,383,128 | 11/1964 | France. |

CARL W. TOMLIN, *Primary Exmainer.*

ANDREW KUNDRAT, *Assistant Examiner.*

UNITED STATES PATENT AND TRADEMARK OFFICE
CERTIFICATE OF CORRECTION

PATENT NO. : 3,378,284
DATED : April 16, 1968
INVENTOR(S) : Clarence E. Blanchard It is certified that error appears in the above—identified patent and that said Letters Patent is hereby corrected as shown below:

Column 4, line 6, after "socket", insert -- including a slot in said ball portion, said slot having a width affording sufficient flexing of said ball portion to allow insertion thereof into said socket --.

Signed and Sealed this

Twenty-fourth Day of April 1984

[SEAL]

Attest:

GERALD J. MOSSINGHOFF

Attesting Officer        Commissioner of Patents and Trademarks